Figure 1:
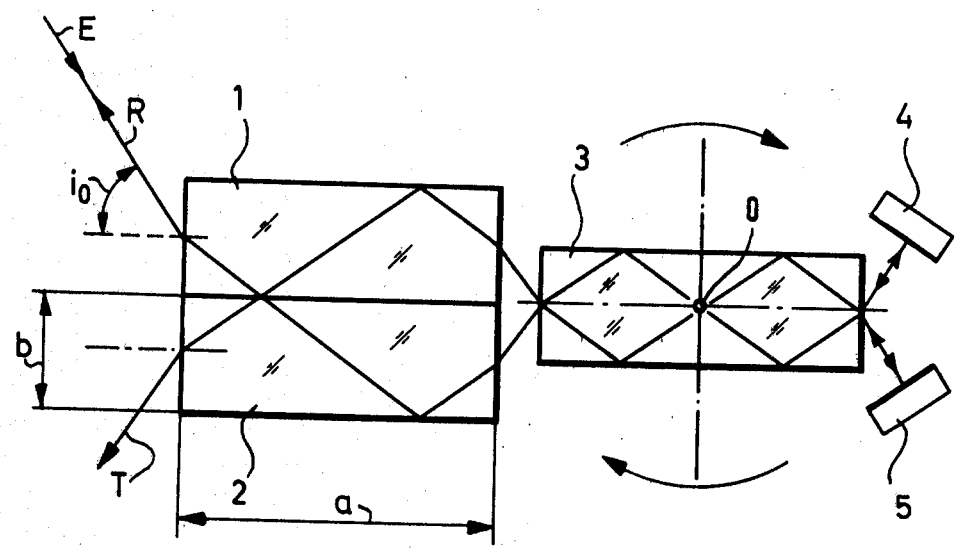

United States Patent [19]

Schaefer et al.

[11] 4,355,394
[45] Oct. 19, 1982

[54] LASER DEVICE FOR GENERATING ULTRASHORT LASER RADIATION PULSES

[75] Inventors: Fritz P. Schaefer, Goettingen, Fed. Rep. of Germany; Jan Jasny, Warsaw, Poland

[73] Assignee: Max Planck Gesellschaft Zur Foerderung der Wissenschaften E.V., Goettingen, Fed. Rep. of Germany

[21] Appl. No.: 115,152

[22] Filed: Jan. 24, 1980

[51] Int. Cl.³ .............................................. H01S 3/11
[52] U.S. Cl. ...................................... 372/16; 372/25; 372/100; 372/108
[58] Field of Search ..................... 331/94.5 C, 94.5 Q; 372/16, 25, 100, 108

[56] References Cited

U.S. PATENT DOCUMENTS

| 3,484,719 | 12/1969 | Smith | 331/94.5 C |
| 3,575,671 | 4/1971 | Dessus et al. | 331/94.5 C |
| 3,614,655 | 10/1971 | Bolger | 331/94.5 C |
| 3,711,791 | 1/1973 | Erickson | 331/94.5 C |
| 3,998,557 | 12/1976 | Javan | 331/94.5 C |

Primary Examiner—William L. Sikes
Attorney, Agent, or Firm—Edwin E. Greigg

[57] ABSTRACT

A laser device especially intended to generate ultrashort light pulses, wherein the laser path is defined by an interferometer (I) providing substantially total reflection, a partial reflector (OM) for decoupling, and a stimulatable laser medium (D) between the interferometer and the partial reflector, the interferometer comprising a beam splitter (1, 2) through which the light pulses are transmitted substantially without loss to a total reflector (4, 5) which reflects the component beams back to the beam splitter, and a device (3) for varying the ratio of the path lengths travelled by the component beams between the beam splitter and the total reflector.

11 Claims, 4 Drawing Figures

NUMBER OF MODULATION PERIODS

LASER DEVICE FOR GENERATING ULTRASHORT LASER RADIATION PULSES

The present invention relates to a laser device for generating laser radiation pulses of predetermined wavelength, said device including at least two reflector arrangements which define a laser radiation path, and of which the first arrangement is capable of substantially fully reflecting the laser radiation whilst the second arrangement is partially transparent for the purpose of decoupling a portion of the laser radiation from said laser radiation path, the device also including a stimulatable laser medium arranged in the laser radiation path and means for stimulating said laser medium.

For many purposes very short light pulses are required, particularly so-called ultrashort light pulses, which in current literature refers in general to pulses having a width at half maximum intensity of less than 100 picoseconds. For the generation of these pulses a variety of laser devices are known, which devices can be classified within two large subgroups of devices which respectively operate with active and with passive phase coupling. In laser devices operating with passive phase coupling, a saturable absorbent, for example a dyestuff solution, is arranged at a suitable position within a laser resonator, whilst in the case of the laser devices which operate with active phase coupling, an externally controllable electro-optical or electroacoustic modulator is provided in the laser resonator. If the laser employed for the generation of ultrashort pulses is a broadband tunable laser, as for example a dyestuff laser, then an additional element is always required for tuning the wavelength, whether operating with active phase coupling or with passive phase coupling. In the case of passive phase coupling, the spectral characteristics of the few hitherto known saturable absorbents, which can be considered for use as passive modulators, determine that the laser can only be utilized within certain narrow spectral ranges. On the other hand, lasers operating with active phase coupling encounter a special difficulty in that the modulator frequency must be accurately adjusted to the value which is necessary in order for the modulator to transmit the ultrashort light pulse circulating in the resonator when it arrives at the modulator.

The present invention has for its basic object the provision of a device operating with active phase coupling, by means of which it is possible to generate reproducible light pulses having a duration of less than 1 microsecond, in particular ultrashort light pulses with a duration of less than 100 picoseconds, within a very large wavelength range, for example from the ultraviolet spectral region over the entire visible spectrum approaching near to the infrared region.

This object is achieved in accordance with the present invention by a laser device of the basic type referred to, wherein the first reflector arrangement is an interferometer which comprises a beam splitter located in the path of the emitted laser radiation for producing two component beams, a reflector means for reflecting the component beams back into the beam splitter, and a device for varying the ratio of the lengths of the optical paths travelled by the respective component beams in passage between the beam splitter and the reflecting means.

In a preferred arrangement, the device for varying the path lengths ratio includes a rotatable component of optically transparent material having parallel surfaces for the entry and the exit of the component beams. Preferably, this rotatable component is a rectangular parallelepiped and is rotatable about an axis substantially normal to the mean direction of propagation of the radiation, and the reflecting means comprises two mirrors which reflect back upon themselves the respective component beams which are emitted from said rotatable parallelepiped.

This preferred laser device, which contains a laser medium tunable over a broad band, has the special advantage that the wavelength is adjustable without the necessity of using an additional element for the purpose.

Moreover the laser device according to the invention has the advantage that, in use, a highly reproducible series of very short laser pulses can be generated.

Figure 2:
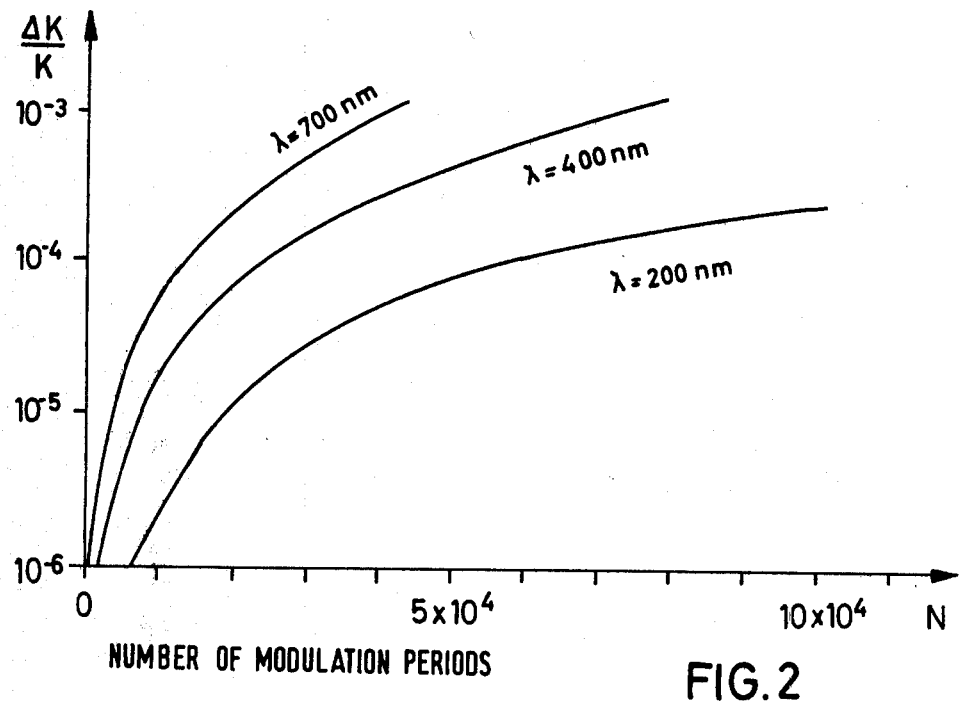
Figure 3:
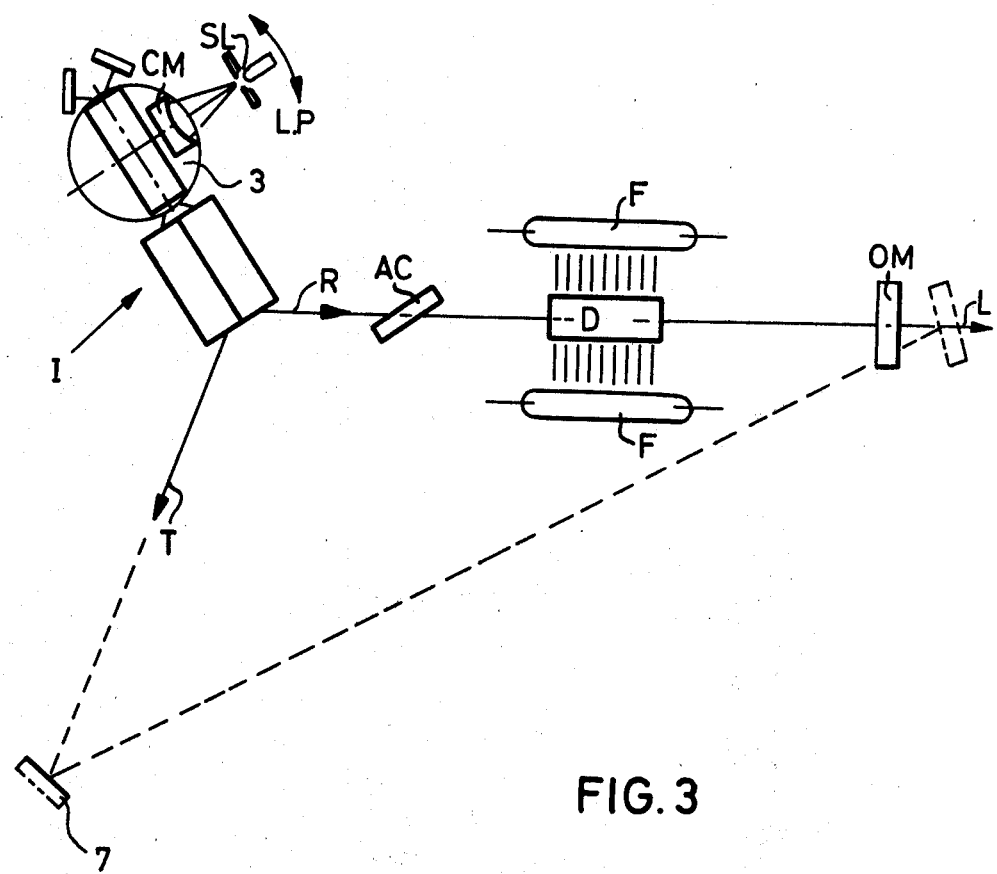
Figure 4:
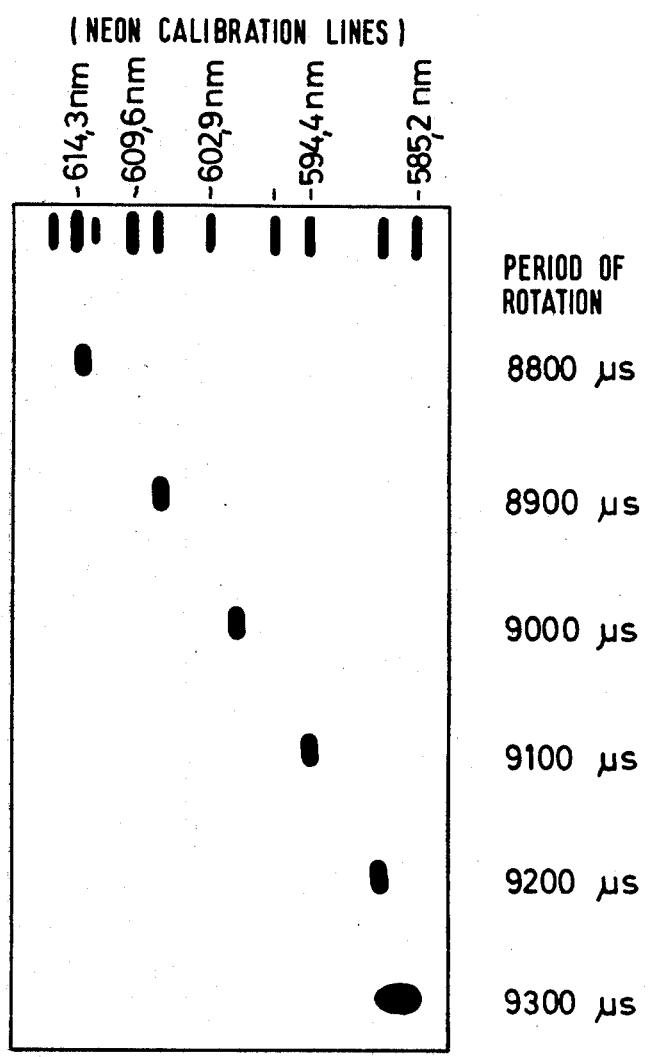

Practical examples of the invention will now be more particularly described with reference to the accompanying drawings, in which:

FIG. 1 is a schematic diagram of a Jasny interferometer which, in the laser device according to the invention, is advantageously used as a reflector arrangement, FIG. 2 is a diagram for explaining the mode of operation of the interferometer according to FIG. 1, FIG. 3 is a schematic diagram of a practical embodiment of the laser device according to the invention and of a modification thereof, and FIG. 4 is a diagram showing the dependence of the laser wavelength upon the frequency of rotation of a rotating component of the interferometer.

Starting, for example, from a linear laser device, which contains an active medium as well as a totally reflecting mirror and a partially transparent decoupling mirror, then in accordance with the invention there is employed, in place of a simple totally reflecting mirror, an interferometer wherein the ratio of the optical lengths of the path travelled by the respective component beams is variable, preferably inversely variable, and advantageously this will be a known variant, proposed by Jasny, of the Michelson interferometer. This interferometer consists essentially of a beam splitter, a rotating block of optically transparent material, such as quartz, and two mirrors. The optical arrangement of a practical example of such an interferometer is shown in FIG. 1.

The beam splitter consists of two blocks of quartz 1 and 2, which have the form of rectangular parallelepipeds of length a and height b, polished on four sides and which, as shown in FIG. 1, are superimposed. The mutually facing surfaces of the two quartz blocks are not, however, in contact, but are separated by a layer of air of 108 nanometers thickness, which spacing is maintained by two spacing vapour deposited strips of $MgF_2$ of about 7 mm width (not shown) at the longitudinal edges of one of the quartz blocks. In consequence of the very small air spacing between the surfaces of the quartz blocks 1 and 2, total reflection at these surfaces is prevented and the "boundary" surface between the two quartz blocks functions as a 50% beam splitter at a light wavelength of 500 nanometers. The division ratio remains in the region of 50% over the entire visible range from near ultraviolet to near infrared. The ratio of the length a to the height b is so selected that $(a/b) = 2n_o$, wherein $n_o$ is the mean refractive index of the material of the blocks (quartz, i.e. in practice quartz glass). A light beam E incident upon the centre of the end surface of block 1 at the Brewster angle $E_o = 55°40'$, is refracted and then split in the ratio of 1:1 at the glass-air interface, thus producing two component beams, which proceed as shown by thin lines in FIG. 1 and, after total reflection at the free longitudinal surfaces of the quartz blocks, again emerge from the two remote end faces of the quartz blocks 1 and 2 and finally enter the end surface of a third quartz block 3. The quartz block 3 has a length a and is designed similarly to the quartz blocks 1 and 2 in respect of its material, shape and surface characteristics. The quartz block 3 is rotatable about an axis which passes through the point indicated at 0 in FIG. 1, that is to say an axis normal to the plane of the drawing and passing through the centre of that face of the quartz block 3 visible in FIG. 1. The two arms or component beam paths of the interferometer are completed by two stationary mirrors 4 and 5, which respectively reflect back upon themselves the component beams emergent from the quartz block 3. The two component beams coming from the beam splitter and entering the block 3 are, as shown, each totally reflected twice at the surfaces of the block 3 and, after reflection at the final mirrors 4 and 5, are doubled back upon themselves to proceed in a return path to the beam splitter 1, 2, where they combine to form a reflected beam R and a transmitted beam T.

When the block 3 is rotated about the axis 0 referred to, then the optical path of one of the component beams is shortened and the path of the other beam is extended by the same length. At a constant rotational speed, the intensities of the reflected and the transmitted beams R and T are thereby sinusoidally modulated in such manner that the maximum intensity of the one beam coincides in time with the minimum intensity of the other beam. Thus when R has a maximum intensity, the intensity of T is equal to 0, i.e. the incident beam E is then reflected upon itself substantially free from loss. The modulation frequency may be very high because the block 3 can rotate (if necessary in vacuo) at a high angular velocity. Because the beams follow precisely the same path through the block 3 in the forward and reverse direction, the described beam control has the property that the influences of all variations of the surfaces caused by the centrifugal force, as well as the resulting polarization effects, and likewise the influences of deviations in the accuracy of adjustment of the block 3 with respect to the rest of the interferometer components, possibly caused by wobbling of the axis of rotation or similar errors, are all self-compensating.

The position of the block 3 shown in FIG. 1 corresponds to the rotation angle $\phi=0$. For small values of the angle $\phi (\phi \leq \pm 5°)$ the modulation period $T_l$ of the beam intensity is an almost linear function of the mechanical rotation period $T_m$:

$$T_l = K(\phi, \lambda) T_m \quad (1)$$

$$K(\phi, \lambda) = \lambda/(4\pi[2\cos\phi(a \sin i_o + 2b \cos i_o) - af(\phi)]) \quad (1a)$$

$$f(\phi) = \sin(i_o+\phi)\cos(i_o+\phi)[n^2-\sin^2(i_o+\phi)]^{-\frac{1}{2}} + \sin(i_o-\phi)\cos(i_o-\phi)[n^2-\sin^2(i_o-\phi)]^{-\frac{1}{2}} \quad (1b)$$

wherein a and b are the above mentioned length and height of the blocks, $i_o$ is the angle of incidence at which the beam E strikes the block 1, $\lambda$ is the wavelength of the light, n is the refractive index of the material of the blocks (e.g., quartz glass) at the wavelength$\lambda$. The factor K $(\phi, \lambda)$ has an order of magnitude of $10^{-7}$.

Thus, in the course of each revolution, the block 3 travels through a small angular range in which the incident beam is reflected by the interferometer. Within this angular range the block assumes a large number N of angular positions in which the condition for an interference maximum is satisfied for laser radiation of a given wavelength reflected (or transmitted) by the interferometer. The period of time required by the block 3 to rotate from one such angular position to the next angular position should be equal to the circulation time of the laser radiation pulse in the laser radiation path (or an aliquot part of the circulation time).

The angular range $-\phi_m < \phi < +\phi_m$ within which the interferometer can modulate the light beam depends essentially upon the required linearity of $T_l$, which is a function of $T_m$, that is to say depends upon the deviation $\Delta K$ from the mean value of K as given in Table 1.

TABLE 1

| $\Delta K/K$ | $10^{-5}$ | $10^{-4}$ | $10^{-3}$ |
|---|---|---|---|
| $\Phi_m$ | 0.5° | −1.5° | −5° |

The utilizable angular range may appear to be quite small, but it must be taken into account that the number N of modulation periods $T_l$ is of the order of magnitude of $10^4$ to $10^5$ (dependent upon ($\Delta K/K$ and $\lambda$). The precise values are shown in FIG. 2. The losses which result from the introduction of the interferometer into the laser resonator can be made very small if the polarization plane is suitably selected, that is to say if, by the selection of the Brewster angle as the angle of incidence, the reflection becomes almost zero, and moreover if the mirrors 4 and 5 are designed as broadband dielectric mirrors with a reflection of almost 100%, whilst the beam splitter operates in the above-described substantially loss-free manner by utilizing the phenomenon of suppressed total reflection.

In FIG. 3 there is shown, as a practical example of the invention, a flashlamp pumped dyestuff laser. The laser includes a dyestuff laser head D, although obviously a continuous dyestuff laser or any other type of laser could instead be used, provided that the pulse halfwidth value must be no longer than a few circulation periods of the light in the resonator. The resonator of the laser is bounded by a partially transparent decoupling mirror OM and by an interferometer I, the construction of which has been described with reference to FIG. 1.

In a preferred practical form of the invention the blocks 1, 2 and 3 consist of quartz glass. The length a is 58.0 mm, height b is 19.8 mm and the width of the block (not critical) is about 20 mm.

The laser head D contains a cuvette with a length of 84.5 mm, an inner diameter of 4 mm and end windows each of 1.5 mm thickness, wherein the active medium is a $2 \cdot 10^{-4}$ molar solution of rhodamine 6G in ethanol. The decoupling mirror OM is a dielectric mirror with 94% reflection power and its spacing from the adjacent end of a cuvette is 160 mm. The total optical length of path from the decoupling mirror OM to the mirror 4 or 5 of the interferometer is 665 mm. For providing stimulation, use is made of four flashlamps (type ILC-3F2) with about 50 mm electrode spacing, whilst the electrical input power for the four lamps amounts to about 60 Joule per shot.

Between the laser head D and the interferometer I an absorber cuvette AC can be inserted in the beam path, to which reference will again be made later. A suitable cuvette has windows of 2 mm thickness and an internal chamber 1.5 mm thick. The windows are set in the beam path at the Brewster angle. The absorbent may be, for example a $1 \cdot 10^{-5}$ molar solution of 3.3' diethyloxadicarbocyanineiodide (DODCI) in ethanol.

The dependence of the operating wavelength $\lambda$ of the dyestuff laser upon the rotation period $T_m$ of the block 3 may be seen from FIG. 4. Because, by reason of the dispersion in the quartz glass and the laser medium, the relationship between $\lambda$ and $T_m$ is not a purely linear function, a wavelength measurement can be effected at two different rotation periods for determining the constants A and B to the simplified approximation:

$$(1/T_m) = A\lambda + (B/\lambda) \qquad (2)$$

which is accurate to better than $10^{-4} T_m$ in the wavelength range 250 nm $< \lambda <$ 700 nm. The rotating quartz block 3 can be arranged on the shaft of a direct current motor (not shown), the speed of which is electronically controllable. Another practical form, which allows even higher speeds to be reached, is one in which the rotating quartz block 3 is supported upon the shaft of an air driven turbine. Together with the quartz block 3, a small concave mirror CM may be mounted upon the rotating support for the block. At a distance from the concave mirror CM exactly corresponding to its radius of curvature, a slit diaphragm SL is provided, behind which is a light source L, and directly above said source behind the diaphragm is a photodiode P or other optical transducer device, as may be seen in FIG. 3. At each revolution of the motor an image of the light source is formed momentarily upon the light transducer P behind the slit, which transducer generates an initiating pulse, which can be employed, for example, to fire the flashlamps at the correct instant for the flashlamp-pumped dyestuff laser or, in another embodiment, to drive an intensity modulator for an argon-ion laser, which pumps a continuous dyestuff laser or, in a still further example, to drive an individual pulse selection device. It is possible by displacing the unit comprising the diaphragm slit SL, the light source L and the light transducer P, in the respective opposed directions indicated by the arrows, substantially to advance and retard the instant of pulse release in relation to the null angular position of the quartz block.

For the purpose of further shortening the half-width value of the circulating ultrashort light pulse, it is also possible, as already stated, to introduce a non-linear absorber at a suitable position in the resonator, for example the cuvette AC (FIG. 3) with a suitable dyestuff solution therein, as is well known in the art for passive phase coupling. This additional absorber is, however, not essential for the generation of pulses and serves only to produce a further narrowing of the half-width value of the pulse and may, if such restriction is not necessary, be omitted.

By the introduction of the interferometer in place of the conventional totally reflecting mirror, a train of laser pulses of predetermined wavelength is generated in the manner described below.

Let if first be assumed that a stationary ultrashort light pulse of suitable wavelength is circulating in the laser resonator and now strikes the centre of the face of the block 1 of the interferometer at one end of the laser resonator, for which purpose the block 3 of the interferometer has to be precisely in that angular position in which maximum reflection is obtained for the given wavelength of the circulating laser pulse. Under such conditions this pulse is reflected through the interferometer substantially without loss, proceeds again through the active medium in the laser head D, whereby it is intensified, and finally strikes the decoupling mirror OM, where the pulse is weakened by the decoupling of a portion L of the radiation. The portion of the radiation remaining in the resonator returns again through the stimulated active medium and is thereby again intensified. The double intensification taking place during the process is sufficient to recoup the decoupling loss, and the beam again strikes the interferometer end of the resonator. It is essential that the rotation speed of the quartz block 3 should be so selected that, during the circulation time of the light pulse in the resonator (i.e. the time taken by the light pulse to travel from the interferometer I to the decoupling mirror OM and back again) the block 3 has turned further through an angle, in practice a small angle, such that the next reflection maximum for the given wavelength is obtained. In this way the pulse is again reflected almost without loss and the above described cycle repeats itself. It is at once evident that it is possible in this manner to hold the pulse stationary in the resonator, that is to say, by the use of the decoupling mirror OM to extract a series of pulses of constant amplitude, having an interval between the pulses which corresponds to the circulation time of the light in the resonator. It is obvious that the speed of rotation of the block may alternatively be an integral multiple of the above mentioned minimum speed of rotation for achieving a stationary circulating pulse.

The magnitude of the half-width of the individual pulses is determined essentially by the net gain of the laser resonator, i.e. it is determined by the product of the loss due to the decoupling and the gain in the active medium. If it is assumed that the value of the circulating pulse impinging upon the interferometer is always precisely at a maximum at the time instant when the maximum reflection of the interferometer is attained, then it is immediately evident that both the rising flank and the falling flank impinge at a time instant when, because of its sinusoidal modulation, the reflection of the interferometer is not at a maximum, and a corresponding loss is therefore suffered because a portion of the pulse energy at the two flanks is subject to transmission losses. It is therefore clear that, by the adjustment of a marginal intensification of the active medium, or by an adjustment of the decoupling to a suitable value, the pulse can always be made narrower, provided that an adequate number of circulations is attained.

As it has been assumed from the start that a stationary pulse is always available, it remains necessary to clarify the extent to which the proposed method makes possible the establishment of such a pulse. For this purpose it is necessary to proceed on the basis that, before the laser threshold is reached, the active medium emits essentially only spontaneous fluorescence which, as is well known, is of a broadband spectral character and fluctuates with time. From what has been said it will be understood that upon the appearance of a time peak of the correct wavelength, which strokes the end of the interferometer at the time instant when the reflection maximum for that particular wavelength occurs, this peak is reflected substantially without any loss, and may then, by repeated passage through the active medium, build up to the state of stationary intensity. Noise peaks which occur at times other than the reflection maximum, or which do not have precisely the correct wavelength are, during each circulation, severely attenuated at the interferometer end of the system and therefore completely fade out after a few circulations.

It is also clear that, by use of the described method, a definite wavelength can always be selected, which wavelength can be adjusted by adjusting the speed of rotation of the quartz block 3. The precise relationship between the desired wavelength and the adjusted speed of rotation has already been set forth in the equations (1) to (1b). If the speed of rotation is increased by 1%, the wavelength increases by about ½%. It is also obvious that, at the adjusted speed of rotation, not only the given wavelength, but also radiation of one half, one third, one quarter and so on of the given wavelength will start up. For example at an adjusted wavelength of 600 nm, there will also be a wavelength of 300 nm or 200 nm. However, because the active medium of the laser has only a relative narrow intensification range, only one of these possible wavelength ranges can be utilized, so that the relationship between the speed of rotation and the desired wavelength is always a definite one, if regard is had to the properties of the active medium of the laser.

Because the interferometer can equally be used in transmission as in reflection, the transmitted beam T then being bent at double the Brewster angle, it is possible for the interferometer, instead of being installed in a linear laser resonator, to be installed in a ring laser resonator, in which case the interferometer is inserted in place of a mirror which would deflect the beam path by the required amount. Therefore the ring laser resonator may, for example, contain, as is indicated in dashed lines in FIG. 3, the interferometer I, the decoupling mirror OM set at a suitable inclination, and a further totally reflecting mirror 7, for example, a dielectric thin film mirror. A circulating pulse will then be established in the ring resonator, which pulse is always incident upon the end of the interferometer at the transmission maximum. The wavelength is again so determined by the speed of rotation of the block that, after exactly one circulation of the pulse in the resonator, the next transmission maximum, or the next-but-one, or a still later transmission maximum of the interferometer occurs. Because two circulation directions are possible in the ring resonator, the question arises if two circulating pulses can be established in opposite directions. This will in fact be the case when the centre of the active medium is arranged at a distance from the end of the interometer which is equivalent to exactly one half the circulation period. However, if the active medium is displaced by a certain amount from this position, then a greater intensification will be experienced by that pulse which first enters the active medium, and can there substantially degrade the inversion stored up between the pulses, whilst the pulse which is incident at a later time instant meets a correspondingly reduced inversion and is correspondingly less intensified. This effect is a maximum when the displacement of the active medium with respect to the centre position amounts to no more than is necessary to allow the first pulse to just issue from the medium at the same time as the second pulse enters the medium. If then the stimulating intensity is not selected at too high a level, a unidirectional laser emission is easily achieved by the ring resonator. Thus, the so-called "spatial hole burning effect" will be avoided in a known manner by using this method of pure travelling wave operation, and substantially higher relative output power and improved stability of the emitted pulse train will be achieved.

In the above described linear dyestuff laser, which is operated with a rhodamine-6G solution having a molar concentration $2 \cdot 10^{-4}$ in ethanol, it is possible continuously to vary the wavelength from 585 nanometers to 615 nanometers if the speed of revolution of the rotating quartz block is increased from 6500 rpm to 6850 rpm. If the pumping intensity is taken only slightly above the threshold value of the laser oscillation, pulses are obtained which typically have a half-width value of about 50 ps. At high pumping intensities a more closely concentrated series of pulses is obtained, which is directly understandable from the above explanation of the method, because under such higher pumping conditions, those pulses which occur shortly before or after the maximum reflection point of the interferometer are still sufficiently amplified to build up to a measurable intensity. As above mentioned, these multiple pulses can, nevertheless, by the insertion of an absorber, again be reduced to an individual pulse having a small half-width value.

A further shortening of the pulses is obtainable by reducing the period of rotation $T_m$ to 5860 microseconds, extending the optical length of the resonator to 857 mm, and arranging the absorber cuvette AC at the optical centre of the resonator. In such a design of the laser device, two pulses are propagated in opposite directions in the resonator, which meet each other at the absorber cuvette, and there is obtained a pulse train having a pulse spacing of 2.8 ns and a substantially shortened pulse width down to a few picoseconds.

The Jasny interferometer according to FIG. 1 obviously can alternatively be employed in combination with an active laser medium which has a relatively narrow band-width and appropriate wavelength, and which is practically non-variable in frequency, or at least not continuously variable in frequency. In this case the Jasny interferometer then serves only to shorten the pulses, and the rotation angle $\phi$ of the block 3 is determined by the emission wavelength.

Instead of the above described preferred Jasny interferometer it is instead possible to employ any other interferometer functioning in a similar manner.

Furthermore, instead of using a square-section rotatable component 3 it is possible to use a simple plane parallel plate. The length of the component 3 may be any desired integral multiple (preferably an even multiple) of 0.5 a. Other lengths of the component 3 are also possible if the dimension b is so varied as to produce analogous reflection conditions.

We claim:

1. A laser device for generating laser radiation pulses of predetermined wavelength, said laser device including at least two reflector arrangements which define a laser radiation path, and of which a first reflector arrangement is capable of substantially fully reflecting the laser radiation and a second reflector arrangement is partially transparent for the purpose of decoupling a portion of the laser radiation from said laser radiation path, the laser device also including a stimulatable laser medium arranged in the laser radiation path for emitting, when stimulated, a laser radiation pulse of the predetermined wavelength which circulates in the laser radiation path, and stimulating means for stimulating said laser medium, wherein the first reflector arrangement is an interferometer which comprises:

a beam splitter located in the laser radiation path for producing two component beams;

a reflector means for reflecting the component beams back into the beam splitter; and path lengths ratio varying means for varying the ratio of the lengths of the optical paths travelled by the respective component beams in passage between the beam splitter and the reflecting means such that during each circulation of the laser radiation pulse in the laser radiation path, an interference maximum at the predetermined wavelength of the laser radiation will occur an integral number of times, said path lengths ratio varying means including a rotatable component of optically transparent material having parallel surfaces for the entry and the exit of the component beams and having an axis of rotation which is substantially normal to the mean direction of propagation of the laser radiation through the rotatable component, and rotating means for rotating the rotatable component about its axis at a predetermined speed of rotation.

2. A laser device according to claim 1, wherein the rotatable component comprises a rectangular parallelepiped and the reflecting means comprises two mirrors which reflect back upon themselves the respective component beams which are emitted from said rotatable parallelepiped.

3. A laser according to claim 1, wherein the stimulatable laser medium is frequency variable, and the rotating means is adjustable to vary the predetermined speed of rotation of the rotatable component to select the predetermined wavelength.

4. A laser device according to claim 1, which further comprises synchronizing means for activating the stimulating means in synchronism with a selected angular position of the rotatable component.

5. A laser device according to claim 1, including an absorber located in the path of the laser radiation.

6. A laser device according to claim 1, wherein the laser medium comprises a stimulatable dyestuff solution.

7. A laser device according to claim 1, wherein the first and second reflector arrangements define a linear optical laser resonator.

8. A laser device according to claim 1, wherein the first and second reflector arrangements, together with at least one further reflector arrangement which is capable of full reflection, constitute a ring laser resonator.

9. A laser device according to claim 1, wherein the beam splitter comprises two components of optically transparent material having mutually facing planar surfaces disposed in the laser radiation path and separated by a very small layer of air which prevents total reflection of the laser radiation, whereby the laser radiation is split into the two component beams.

10. A laser device for generating laser radiation pulses of predetermined wavelength, said laser device including at least two reflector arrangements which define a laser radiation path, and of which a first reflector arrangement is capable of substantially fully reflecting the laser radiation and a second reflector arrangement is partially transparent for the purpose of decoupling a portion of the laser radiation from said laser radiation path, the laser device also including a stimulatable laser medium arranged in the laser radiation path for emitting, when stimulated, a laser radiation pulse of the predetermined wavelength which circulates in the laser radiation path, and stimulating means for stimulating said laser medium, wherein the first reflector arrangement is an interferometer which comprises:

a beam splitter located in the laser radiation path for producing two component beams;

a reflector means for reflecting the component beams back into the beam splitter; and path lengths ratio varying means for varying the ratio of the lengths of the optical paths travelled by the respective component beams in passage between the beam splitter and the reflecting means, including a rotatable rectangular parallelepiped of optically transparent material which has parallel surfaces for the entry and the exit of the component beams and which is rotatable about an axis substantially normal to the mean direction of propagation of the laser radiation, rotating means for rotating the rectangular parallelepiped about its axis at a predetermined speed of rotation, and synchronizing means for activating the stimulating means in synchronism with a selected angular position of the rotatable rectangular parallelepiped;

wherein the reflecting means comprises two mirrors which reflect back upon themselves the respective component beams which are emitted from said rotatable parallelepiped.

11. A laser device according to claim 10, wherein said predetermined speed of rotation of the rectangular parallelepiped about its axis is selected to satisfy the condition that, during a circulation of the laser radiation pulse in the radiation path, an interference maximum at the wavelength of the laser radiation will occur an integral number of times.

* * * * *